US012739911B2

(12) United States Patent
Choi

(10) Patent No.: US 12,739,911 B2
(45) Date of Patent: Sep. 15, 2026

(54) ELECTRONIC DEVICE FOR WIRELESS LAN COMMUNICATION AND OPERATION METHOD THEREOF

(71) Applicant: SAMSUNG ELECTRONICS CO., LTD., Suwon-si (KR)

(72) Inventor: Junsu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 18/461,447

(22) Filed: Sep. 5, 2023

(65) Prior Publication Data

US 2024/0073983 A1 Feb. 29, 2024

Related U.S. Application Data

(63) Continuation of application No. PCT/KR2023/011874, filed on Aug. 10, 2023.

(30) Foreign Application Priority Data

Aug. 29, 2022 (KR) ........................ 10-2022-0108650
Oct. 12, 2022 (KR) ........................ 10-2022-0130276

(51) Int. Cl.
*H04W 76/15* (2018.01)
*H04B 7/06* (2006.01)
(Continued)

(52) U.S. Cl.
CPC .......... *H04W 76/15* (2018.02); *H04B 7/0626* (2013.01); *H04W 48/02* (2013.01); *H04W 84/12* (2013.01)

(58) Field of Classification Search
CPC ..... H04W 76/15; H04W 48/02; H04W 84/12; H04W 24/08; H04W 28/02; H04W 28/04;
(Continued)

(56) References Cited

U.S. PATENT DOCUMENTS

2007/0133459 A1 6/2007 Kim et al.
2011/0176599 A1 7/2011 Luo et al.
(Continued)

FOREIGN PATENT DOCUMENTS

CN 113676298 A 11/2021
EP 3651494 B1 9/2022
(Continued)

OTHER PUBLICATIONS

International Search Report for PCT/KR2023/011874 by Korean Intellectual Property Office dated Nov. 15, 2023.
(Continued)

*Primary Examiner* — Kwang B Yao
*Assistant Examiner* — Syed M Bokhari
(74) *Attorney, Agent, or Firm* — Nixon & Vanderhye P.C.

(57) ABSTRACT

Various embodiments of the disclosure relate to apparatuses and methods for WLAN communication in an electronic device. Example electronic devices according to the present disclosure may include a communication circuit configured to support WLAN communication and at least one processor, wherein the processor is configured to identify the number of times of reception of retransmission data of each of a plurality of links with an external electronic device for a designated time period, based on the number of times of reception of the retransmission data, when the plurality of links includes a link satisfying a designated error condition, identify another link related to the link satisfying the designated error condition, and restrict the WLAN communication via the another link related to the link satisfying the designated error condition.

18 Claims, 7 Drawing Sheets

(51) Int. Cl.
*H04W 48/02* (2009.01)
*H04W 84/12* (2009.01)

(58) Field of Classification Search
CPC ... H04W 48/04; H04B 7/0626; H04B 17/318; H04B 17/336; H04L 1/0026; H04L 1/1825; H04L 1/1848; H04L 1/1864; H04L 1/1893; H04L 1/1896
USPC .......................................................... 370/329
See application file for complete search history.

(56) References Cited

U.S. PATENT DOCUMENTS

2013/0294429 A1 11/2013 Wang et al.
2015/0264685 A1* 9/2015 Adachi ............. H04W 72/0446 370/329
2015/0296558 A1 10/2015 Seo et al.
2020/0163089 A1 5/2020 Xu et al.
2021/0014776 A1 1/2021 Patil et al.
2021/0045008 A1* 2/2021 Bajko ................... H04W 12/03
2021/0050960 A1* 2/2021 Jang ........................ H04W 4/80
2021/0297184 A1 9/2021 Huang et al.
2022/0182184 A1* 6/2022 Wang .................... H04L 1/1621
2022/0322473 A1* 10/2022 Hwang ................. H04W 76/15
2023/0011167 A1 1/2023 Chitrakar et al.
2023/0155641 A1* 5/2023 Kim ...................... H04W 76/15 370/252
2023/0199551 A1 6/2023 Kim et al.
2023/0217521 A1 7/2023 Kim et al.
2023/0413175 A1* 12/2023 Guo ...................... H04L 5/0091
2024/0022956 A1* 1/2024 Sugaya ................. H04L 1/1628

FOREIGN PATENT DOCUMENTS

EP 4145938 A1 3/2023
KR 10-2007-0060597 A 6/2007
KR 10-2015-0044894 A 4/2015
WO 2021/126075 A1 6/2021
WO 2022/035291 A1 2/2022
WO 2022/055323 A1 3/2022

OTHER PUBLICATIONS

Chitrakar, Rojan "Comment Resolutions for 11be DO.3 ML retransmission CIDs", IEEE 802. 11-21/0302r2. Mar. 2021.
Seok, Yongho "CR for CIDs on TID-to-Link Mapping Part 2", IEEE 802.11-22/0601r1. Apr. 2022.
Patil, Abhishek et al. "LB 266 Resolution for CIDs related to frame exchange during MLO discovery & association", IEEE 802.11-22/1006r2. Aug. 2022.
Extended European Search Report dated Aug. 13, 2025 for EP Application No. 23860725.3.

* cited by examiner

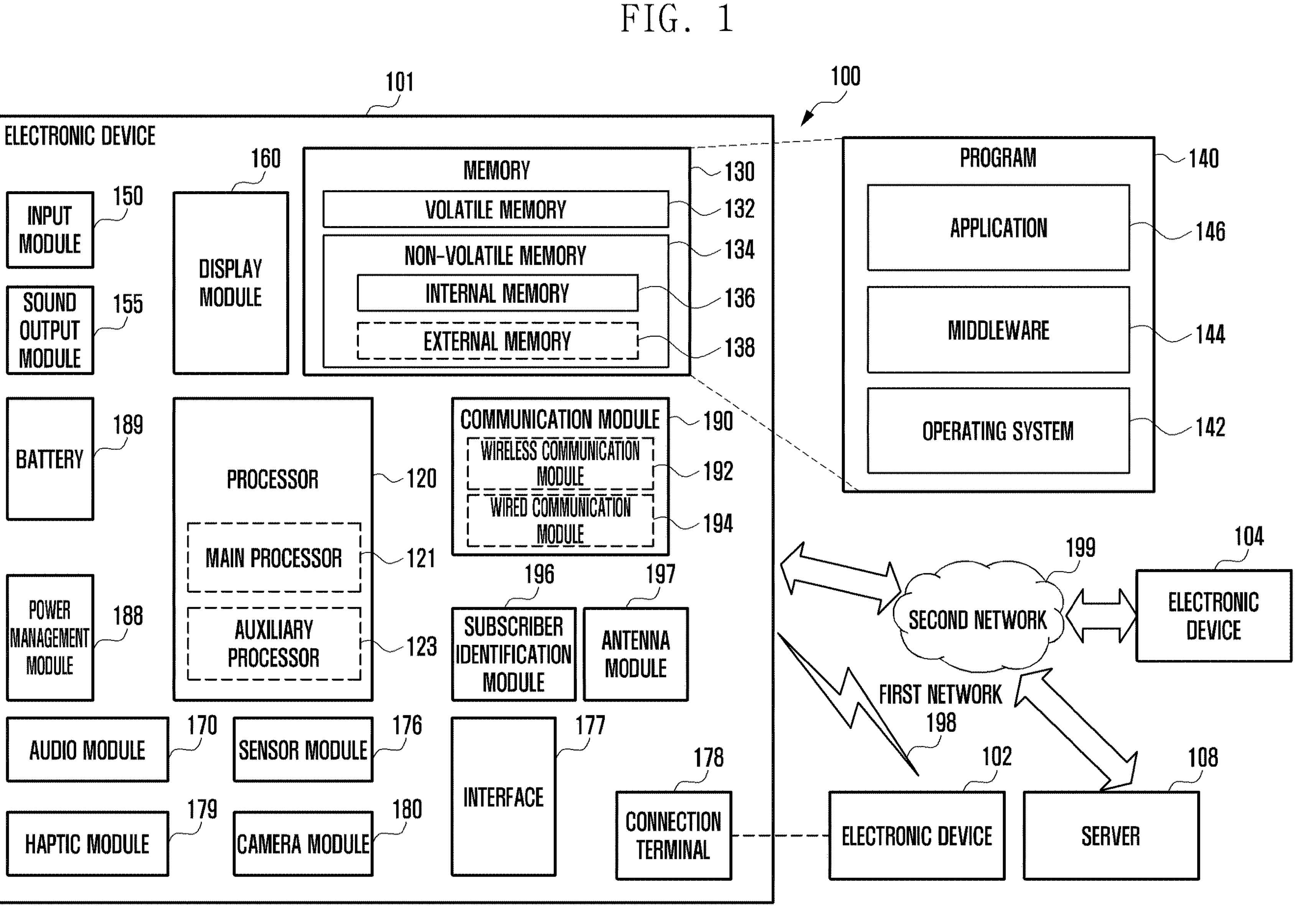
FIG. 1
100
101
ELECTRONIC DEVICE
150
INPUT MODULE
155
SOUND OUTPUT MODULE
189
BATTERY
188
POWER MANAGEMENT MODULE
170
AUDIO MODULE
179
HAPTIC MODULE
160
DISPLAY MODULE
120
PROCESSOR
121
MAIN PROCESSOR
123
AUXILIARY PROCESSOR
176
SENSOR MODULE
180
CAMERA MODULE
130
MEMORY
132
VOLATILE MEMORY
134
NON-VOLATILE MEMORY
136
INTERNAL MEMORY
138
EXTERNAL MEMORY
190
COMMUNICATION MODULE
192
WIRELESS COMMUNICATION MODULE
194
WIRED COMMUNICATION MODULE
196
SUBSCRIBER IDENTIFICATION MODULE
197
ANTENNA MODULE
177
INTERFACE
178
CONNECTION TERMINAL
140
PROGRAM
146
APPLICATION
144
MIDDLEWARE
142
OPERATING SYSTEM
199
SECOND NETWORK
198
FIRST NETWORK
104
ELECTRONIC DEVICE
108
SERVER
102
ELECTRONIC DEVICE

FIG. 5

EXTERNAL ELECTRONIC DEVICE
220
231 FIRST LINK
232 SECOND LINK
233 THIRD LINK
500
510
520
ELECTRONIC DEVICE
101

ELECTRONIC DEVICE FOR WIRELESS LAN COMMUNICATION AND OPERATION METHOD THEREOF

CROSS-REFERENCE TO RELATED APPLICATIONS

This application is a continuation application of International Application No. PCT/KR2023/011874 filed on Aug. 10, 2023, which claims priority from and derives the benefit of Korean Patent Application No. 10-2022-0108650, filed on Aug. 29, 2022 and Korean Patent Application No. 10-2022-0130276, filed on Oct. 12, 2022, the entire contents of which are hereby incorporated in their entirety, by reference.

TECHNICAL FIELD

Various embodiments of the disclosure relate to electronic devices for wireless LAN communication and operation methods thereof.

BACKGROUND

A wireless local area network (WLAN) system may support wireless connection of various electronic devices such as a smartphone, a tablet personal computer (PC), or a notebook by using a designated frequency band (e.g., a band of about 2.4 GHz, a band of about 5 GHz, and/or a band of about 6 GHz).

The WLAN system may be installed not only in a private space such as a home, but also in a public space such as an airport, a train station, an office, or a department store. The WLAN system may be defined in the IEEE 802.11 standard. For example, the IEEE 802.11 standard is evolving into IEEE 802.11b, IEEE 802.11a, IEEE 802.11g, IEEE 802.11n, IEEE 802.11ac, IEEE 802.11ax, and IEEE 802.11be.

A WLAN system may include a large number of access points (APs) to provide a communication function to a large number of users in a wide area. The APs may have at least some overlapping service areas (e.g., coverage). The APs and electronic devices performing communication via the APs may share limited radio resources (e.g., frequency resources), so that, due to signal interference, transmission and/or reception of data (or a packet) may fail, data processing speed may decrease, and/or latency may increase.

A transmission device may perform clear channel assessment (CCA) for identifying whether a wireless medium (or a wireless resource) is occupied by another transmission device before transmitting data, based on carrier sensing multiple access with collision avoidance (CSMA/CA) to reduce the influence of interference by another transmission device. For example, when the CCA is used, the transmission device may randomly configure a counter (e.g., a counter of a back-off window) within a contention window (CW). The transmission device may decrease the counter, based on a designated pattern, during an interval in which it is determined that another transmission device does not occupy a wireless medium. When the counter becomes a designated value (e.g., “0”), the transmission device may transmit data by occupying the wireless medium. When it is determined that the transmission of the data has failed, the transmission device may increase the size of the CW to retransmit the data.

When it is not determined, by using the CCA, that another transmission device has occupied a wireless medium, the transmission device may transmit data by occupying the wireless medium. When a reception device which receives data from the transmission device is located between the transmission device and the another transmission device, the reception device may be restricted from receiving data from the transmission device due to the influence of interference (e.g., hidden interference) from the another transmission device.

Various embodiments of the disclosure provide an apparatus and a method for reducing influence of interference from a peripheral device (e.g., another transmission device) by using a plurality of links with an external electronic device (e.g., a transmission device) in an electronic device (e.g., a reception device) supporting WLAN communication.

The technical problems to be achieved herein may not be limited to the above-mentioned technical problems, and other technical problems not mentioned may be clearly understood, through the following descriptions, by those skilled in the art to which the disclosure belongs.

Solutions

According to various embodiments, an electronic device may include a communication circuit configured to support WLAN communication, and a processor operatively connected with the communication circuit. According to various embodiments, the processor may establish a plurality of links with an external electronic device via the communication circuit. According to various embodiments, the processor may identify at least one of channel state information or the number of times of reception of retransmission data via each of the plurality of links for a designated time period. According to various embodiments, based on at least one of the channel state information or the number of times of reception of the retransmission data, when the plurality of links includes a link satisfying a designated error condition, the processor may identify another link related to the link satisfying the designated error condition among the plurality of links. According to various embodiments, the processor may restrict the WLAN communication via the another link related to the link satisfying the designated error condition.

According to various embodiments, an operation method of an electronic device may include establishing a plurality of links with an external electronic device, based on WLAN communication. According to various embodiments, the operation method of the electronic device may include identifying at least one of channel state information or the number of times of reception of retransmission data via each of the plurality of links for a designated time period. According to various embodiments, the operation method of the electronic device may include, based on at least one of the channel state information or the number of times of reception of the retransmission data, when the plurality of links includes a link satisfying a designated error condition, identifying another link related to the link satisfying the designated error condition among the plurality of links. According to various embodiments, the operation method of the electronic device may include restricting the WLAN communication via the another link related to the link satisfying the designated error condition.

According to various embodiments, a non-transitory computer-readable storage medium (or computer program product) storing one or more programs may be described. According to various embodiments, the one or more programs may include instructions which, when executed by a processor of an electronic device, perform operations including establishing a plurality of links with an external electronic device, based on WLAN communication, identifying at least one of channel state information or the number of times of reception of retransmission data via each of the plurality of links for a designated time period, based on at least one of the channel state information or the number of times of reception of the retransmission data, when the plurality of links includes a link satisfying a designated error condition, identifying another link related to the link satisfying the designated error condition among the plurality of links, and restricting the WLAN communication via the another link related to the link satisfying the designated error condition.

According to various embodiments of the disclosure, an electronic device (e.g., a reception device) restricts the use of at least one link in which an error has occurred in receiving data (or a packet) among a plurality of links with an external electronic device (e.g., a transmission device), thereby preventing the deterioration of reception performance from the external electronic device.

According to various embodiments, an electronic device (e.g., a reception device) performs retransmission of data by using a link different from a link for transmission of data (or a packet) among a plurality of links with an external electronic device (e.g., a transmission device), thereby reducing transmission latency of the data.

The effects obtainable from various embodiments of the disclosure are not limited to the above-mentioned effects, and other effects not mentioned may be clearly understood, through the following descriptions, by those skilled in the art to which various embodiments of the disclosure belongs.

BRIEF DESCRIPTION OF DRAWINGS

FIG. 1 is a block diagram of an electronic device in a network environment according to various embodiments;

FIG. 5 shows an example of retransmitting data by using an MLO in an external electronic device according to various embodiments;

Figure 2:
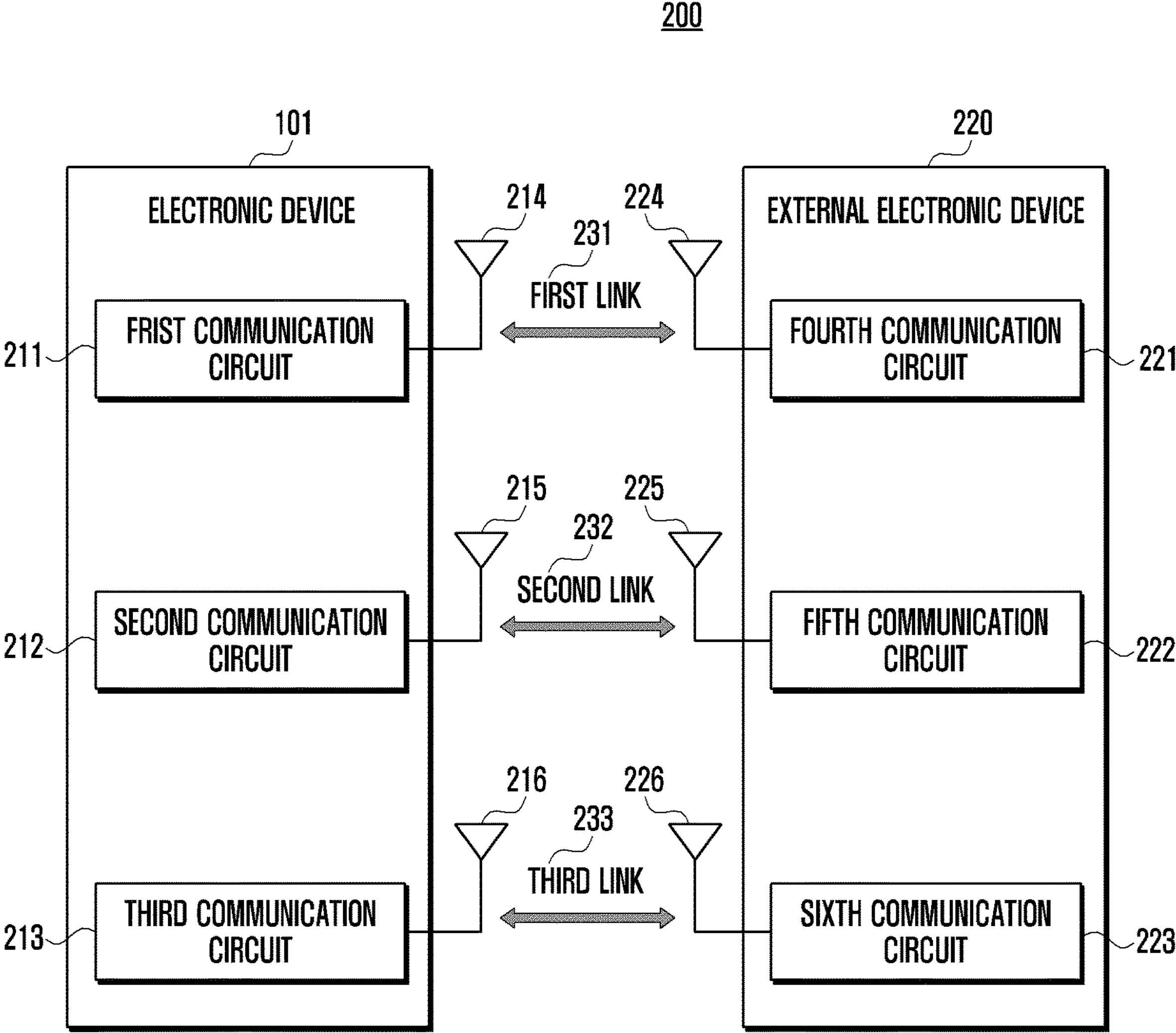
FIG. 2 shows an example of a multi-link operation (MLO) in a WLAN system according to various embodiments.

Hereinafter, various embodiments will be described in detail with reference to the accompanying drawings.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, a plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. By way of example, each of the phrases "at least one of A, B, and C" or "at least one of A, B, or C" refers to only A, only B, or only C; any combination of A, B, and C; and/or at least one of each of A, B, and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 2 shows an example of a multi-link operation (MLO) in a WLAN system according to various embodiments. As an example, an electronic device 101 of FIG. 2 may be at least partially similar to the electronic device 101 of FIG. 1 or may include another embodiment of the electronic device.

According to various embodiments referring to FIG. 2, a WLAN system 200 may include the electronic device 101 and/or an external electronic device 220. According to various embodiments, the electronic device 101 may perform WLAN communication with the external electronic device 220. For example, the WLAN communication may include Wi-Fi. For example, the external electronic device 220 may serve as a base station which provides WLAN communication to at least one electronic device 101 located within a communication radius of the WLAN system 200. As an example, the external electronic device 220 may include an access point (AP) of IEEE 802.11. For example, the electronic device 101 may include a station (STA) of IEEE 802.11.

According to various embodiments, the electronic device 101 and the external electronic device 220 may support a multi-link operation (MLO). The multi-link operation may include a communication scheme of transmitting or receiving data (or a packet) via a plurality of links (e.g., a first link 231, a second link 232, and/or a third link 233). As an example, the multi-link operation may include a communication scheme of transmitting or receiving data via a plurality of links, based on a plurality of bands or a plurality of channels. As an example, the plurality of bands may include a band of about 2.4 GHz, a band of about 5 GHz, and/or a band of about 6 GHz.

According to various embodiments, the electronic device 101 may include a plurality of communication circuits (e.g., a first communication circuit 211, a second communication circuit 212, and/or a third communication circuit 213) in order to support the multi-link operation. According to various embodiments, the first communication circuit 211 may transmit data to the external electronic device 220 (e.g., a fourth communication circuit 221) via the first link 231, and/or receive data transmitted by the external electronic device 220 (e.g., the fourth communication circuit 221) via the first link 231. The first communication circuit 211 may output and/or receive a signal in a frequency band corresponding to the first link 231 via a first antenna 214. According to various embodiment, the second communication circuit 212 may transmit data to the external electronic device 220 (e.g., a fifth communication circuit 222) via the second link 232, and/or receive data transmitted by the external electronic device 220 (e.g., the fifth communication circuit 222) via the second link 232. The second communication circuit 212 may output or receive a signal in a frequency band corresponding to the second link 232 via a second antenna 215. According to various embodiments, the third communication circuit 213 may transmit data to the external electronic device 220 (e.g., a sixth communication circuit 223) via the third link 233, and/or receive data transmitted by the external electronic device 220 (e.g., the sixth communication circuit 223) via the third link 233. The third communication circuit 213 may output or receive a signal in a frequency band corresponding to the third link 233 via a third antenna 216.

According to various embodiments, the external electronic device 220 may include a plurality of communication circuits (e.g., the fourth communication circuit 221, the fifth communication circuit 222, and/or the sixth communication circuit 223) in order to support the multi-link operation. According to various embodiments, the fourth communication circuit 221 may transmit data to the electronic device 101 (e.g., the first communication circuit 211) via the first link 231, and/or receive data transmitted by the electronic device 101 (e.g., the first communication circuit 211) via the first link 231. The fourth communication circuit 221 may output or receive a signal in a frequency band corresponding to the first link 231 via a fourth antenna 224. According to various embodiments, the fifth communication circuit 222 may transmit data to the electronic device 101 (e.g., the second communication circuit 212) via the second link 232, and/or receive data transmitted by the electronic device 101 (e.g., the second communication circuit 212) via the second link 232. The fifth communication circuit 222 may output or receive a signal in a frequency band corresponding to the second link 232 via a fifth antenna 225. According to various embodiments, the sixth communication circuit 223 may transmit data to the electronic device 101 (e.g., the third communication circuit 213) via the third link 233, and/or receive data transmitted by the electronic device 101 (e.g., the third communication circuit 213) via the third link 233. The sixth communication circuit 223 may output or receive a signal in a frequency band corresponding to the third link 233 via a sixth antenna 226.

According to various embodiments, frequency bands of the first link 231, the second link 232, and the third link 233 may be different from each other. For example, the frequency band of the first link 231 may be about 2.5 GHz, the frequency band of the second link 232 may be about 5 GHz, and the frequency band of the third link 233 may be about 6 GHz.

According to various embodiments, the first link 231, the second link 232, and/or the third link 233 may also use an external device other than the electronic device 101. As an example, the external device may include another electronic device supporting WLAN communication other than the electronic device 101 and the external electronic device 220. According to various embodiments, the electronic device 101 may support a carrier sense multiple access with collision avoidance (CSMA/CA) scheme so that the electronic device 101 and the external device simultaneously use the same link and thus do not interfere with each other. As an example, the CSMA/CA scheme may be a scheme of, when a specific link (e.g., the first link 231, the second link 232, and/or the third link 233) is in an idle state, transmitting data via the specific link. For example, the electronic device 101 supporting CSMA/CA may identify whether the external device transmits data via the specific link. When it is determined that the external device transmits data via the specific link, the electronic device 101 may operate in a standby state without performing data transmission using the specific link. For example, when it is determined that the external device does not transmit data via the specific link, the electronic device 101 supporting CSMA/CA may transmit data via the specific link according to a designated scheme. As an example, the designated scheme may include a clear channel assessment (CCA).

According to various embodiments, the first link 231, the second link 232, and/or the third link 233 supported by the multi-link operation may independently support CSMA/CA. According to various embodiments, the electronic device 101 may identify whether the first link 231 is in an idle state, based on information related to the idle state of the first link 231 included in data transmitted by the external electronic device 220 based on detection of data to be transmitted via WLAN communication. As an example, the information related to the idle state of the first link 231 may be included in a ready to send (RTS) message for requesting data transmission via the first link 231 and/or a clear to send (CTS) message indicating that data transmission via the first link 231 is possible. For example, the electronic device 101 may identify whether the first link 231 is in an idle state with reference to a CCA state field and/or a network allocation vector (NAV) configuration field of the RTS message and/or the CTS message. The electronic device 101 may determine whether the first link 231 is physically in an idle state with reference to the CCA state field, and may determine whether the first link 231 is logically in an idle state with reference to the NAV configuration field. For example, the electronic device 101 may restrict deduction of a variable (e.g., a counter of a back-off window) for determining an occupation time point of a wireless medium of the electronic device 101, based on the determination that the first link 231 is not in an idle state. As an example, the restricting of the deduction of the variable for determining the occupation time point of the wireless medium may include a series of operations for performing a control such that a counter of a back-off window does not decrease while it is determined that the external device uses (or occupies) the first link 231. For example, the electronic device 101 may reduce a variable (e.g., a counter of a back-off window) for determining an occupation time point of a wireless medium of the electronic device 101, based on the determination that the first link 231 is in an idle state. For example, when the variable for determining the occupation time point of the wireless medium becomes a designated value (e.g., "0"), the electronic device 101 may transmit data to the external electronic device 220 by occupying the first link 231. According to various embodiments, the electronic device 101 may occupy the second link 232 and/or the third link 233 in the same manner as the manner of occupying the first link 231, based on an idle state of the second link 232 and/or third link 233, and transmit data to the external electronic device 220. Accordingly, a detailed description of an operation in which the electronic device 101 occupies the second link 232 and/or the third link 233 may be omitted.

According to various embodiments, the electronic device 101 and/or the external electronic device 220 may detect (predict) a latency time of the first link 231, the second link 232, and/or the third link 233. The electronic device 101 and/or the external electronic device 220 may detect (predict) a latency time with respect to a combination of at least two links among the first link 231, the second link 232, and/or the third link 233. For example, a latency time with respect to a combination of at least two links may be detected (or predicted) based on a harmonic mean of latency times of the at least two links included in the combination of the links. As an example, a harmonic mean of latency times of links may indicate a reciprocal number of the sum of reciprocal numbers of the latency times of the links.

According to various embodiments, the electronic device 101 and/or the external electronic device 220 may activate or deactivate at least some links among a plurality of links (e.g., the first link 231, the second link 232, the third link 233, and/or a combination of at least two links), based on a latency time required to perform a service (or a function or an application program) and latency times of the plurality of links. According to various embodiments, when a service requiring a relatively high latency time is performed, the electronic device 101 and/or the external electronic device 220 may perform the service via some links of the first link 231, the second link 232, and/or the third link 233. The electronic device 101 and/or the external electronic device 220 may deactivate at least some links, based on a latency time required to perform a service and a latency time of a combination of the first link 231, the second link 232, and/or the third link 233. For example, the electronic device 101 and/or the external electronic device 220 may maintain, in an active state, links capable of implementing a latency time lower than a latency time required to perform a service (or a function or an application program) or a combination of the links (or switch the same to an active state). The electronic device 101 and/or the external electronic device 220 may switch remaining links other than links maintained in an active state or a combination of the links, among the plurality of links, to an inactive state (or maintain the same in an inactive state). According to various embodiments, the electronic device 101 may activate or deactivate a specific link via a "TID-to link mapping" negotiation with the external electronic device 220. For example, when the specific link is activated, the electronic device 101 may transmit, to the external electronic device 220, a "TID-to-link mapping element" obtained by mapping a traffic identifier (TID) to identification information of a link to be activated. As an example, the TID may include information related to the type of data to be transmitted via the specific link. For example, when the specific link is deactivated, the electronic device 101 may transmit, to the external electronic device 220, a "TID-to-link mapping element" in which mapping between a TID and identification information of a link to be deactivated is released.

Figure 3:
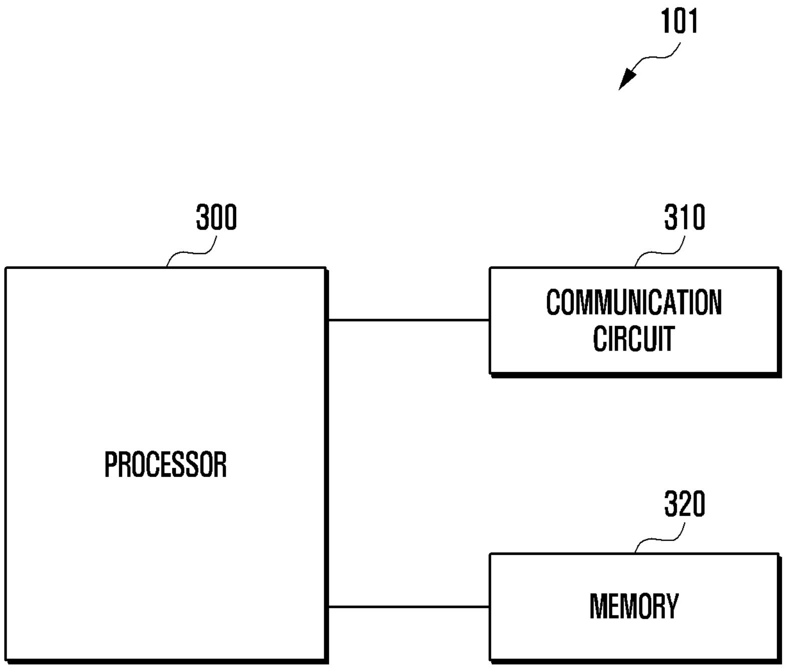
FIG. 3 is a block diagram of an electronic device supporting an MLO according to various embodiments.

FIG. 3 is a block diagram of an electronic device supporting an MLO according to various embodiments. According to various embodiments, an electronic device 101 of FIG. 3 may be at least partially similar to the electronic device 101 of FIG. 1 or 2, or may include another embodiment of the electronic device.

According to various embodiments of the disclosure referring to FIG. 3, the electronic device 101 may include a processor 300 (e.g., including processing circuitry), a communication circuit 310, and/or a memory 320. According to various embodiments, the processor 300 may be substantially the same as the processor 120 of FIG. 1 or included in the processor 120. The communication circuit 310 may be substantially the same as the wireless communication module 192 of FIG. 1 or included in the wireless communication module 192. The memory 320 may be substantially the same as the memory 130 of FIG. 1 or included in the memory 130. According to various embodiments, the processor 300 may be operatively, functionally, and/or electrically connected with the communication circuit 310 and/or the memory 320.

According to various embodiments, the processor 300 may control the communication circuit 310 to establish a plurality of links (e.g., the first link 231, the second link 232, and/or the third link 233 of FIG. 2) with the external electronic device 220. As an example, the plurality of links may support different frequency bands (e.g., a band of about 2.4 GHz, a band of about 5 GHz, and/or a band of about 6 GHz).

According to various embodiments, the processor 300 may identify the number of times of reception (or a reception rate) of retransmission data via each of the links for a designated time period. According to various embodiments, the processor 300 may determine whether the corresponding data is retransmission data, based on configuration information of a "retry" subfield of a frame control field included in a media access control (MAC) header of data received via each of the links.

According to various embodiments, the processor 300 may identify whether a link satisfying a designated error condition exists among the plurality of links, based on channel state information and/or the number of times of reception of the retransmission data via each of the links. According to various embodiments, the processor 300 may determine that the designated error condition is satisfied when the number of times of reception of the retransmission data via each of the links exceeds a designated number of times of error detection (or a designated reference number of times). The processor 300 may determine that the designated error condition is not satisfied when the number of times of reception of the retransmission data via each of the links is less than or equal to the designated number of times of error detection. According to various embodiments, the processor 300 may determine that the designated error condition is satisfied when the number of times of reception of the retransmission data via each of the links exceeds the designated number of times of error detection (or the designated reference number of times) and the channel state information is equal to or less than a reference value. The processor 300 may determine that the designated error condition is not satisfied when the number of times of reception of the retransmission data via each of the links is less than or equal to the designated number of times of error detection or the channel state information exceeds the reference value. As an example, the channel state information may include at least one of channel utilization, a reference signal received power (RSRP), a reference signal received quality (RSRQ), a received signal strength indicator (RSSI), or a signal to interference plus noise ratio (SINR).

According to various embodiments, the processor 300 may detect a reception rate of the retransmission data of each of the links, based on the channel state information and/or the number of times of reception of the retransmission data via each of the links for a designated time period. The processor 300 may determine that the designated error condition is satisfied when the reception rate of the retransmission data of each of the links exceeds a designated error detection rate (or a designated reference rate). The processor 300 may determine that the designated error condition is not satisfied when the reception rate of the retransmission data of each of the links is less than or equal to the designated error detection rate. As an example, a reception rate of retransmission data may indicate the rate of the number of times data is received and the number of times retransmission data is received via a specific link for a designated time period.

According to various embodiments, when the link satisfying the designated error condition exists, the processor 300 may identify another link related to the link satisfying the designated error condition. According to various embodiments, the processor 300 may detect the another link related to the link satisfying the designated error condition, based on information related to a retransmission link. As an example, the information related to the retransmission link may include information related to a link for, when transmission of data (or retransmission data) from the external electronic device 220 to the electronic device 101 via a specific link has failed, retransmitting the data (or retransmission data) which has failed to be transmitted. As an example, the information related to the retransmission link may include information related to a designated pattern for configuring (or selecting) a link for retransmission. As an example, the information related to the retransmission link may be configured (or updated) via consultation between the electronic device 101 and the external electronic device 220. As an example, consultation relating to the information related to the retransmission link may be performed at a time point of establishing a plurality of links with the external electronic device 220 or after establishing the plurality of links. As an example, the link for retransmission may include a link different from a link which has failed to transmit the data (or retransmission data) to the electronic device 101 among the plurality of links. As an example, the another link related to the link satisfying the designated error condition may include a link used for transmission of a previous time point (or an immediately previous time point) of data (or retransmission data) related to retransmission data received via the link satisfying the designated error condition.

According to various embodiments, the processor 300 may control the communication circuit 310 to restrict the use of the another link related to the link satisfying the designated error condition. According to various embodiments, when the second link 232 satisfies the designated error condition, the processor 300 may identify the first link 231 related to the second link 232, based on the information related to the retransmission link. For example, data transmitted (or retransmitted) from the external electronic device 220 to the electronic device 101 via the first link 231 at a previous time point (or an immediately previous time point) may be retransmitted to the electronic device 101 via the second link 232 based on a transmission failure to the electronic device 101. According to various embodiments, the processor 300 may control the communication circuit 310 to restrict the use of the first link 231 via a "TID-to-link mapping" negotiation with the external electronic device 220. For example, the processor 300 may control the communication circuit 310 to transmit, to the external electronic device 220, a "TID-to-link mapping element" in which mapping of a TID and identification information of the first link 231 is released. For example, the processor 300 may control the communication circuit 310 to transmit, to the external electronic device 220, a "TID-to-link mapping element" in which mapping of a TID and identification information of a downlink of the first link 231 is released. As an example, an uplink of the first link 231 may be maintained in an active state. As an example, the "TID-to-link mapping element" may be included in a request frame related to "TID-to-link mapping" and transmitted to the external electronic device 220. As an example, the downlink of the first link 231 may include a link via which the electronic device 101 receives data from the external electronic device 220. As an example, the uplink of the first link 231 may include a link via which the electronic device 101 transmits data to the external electronic device 220.

According to various embodiments, the communication circuit 310 may transmit and/or receive a signal and/or data to and/or from at least one external electronic device (e.g., the external electronic device 220 of FIG. 2) via WLAN communication.

According to various embodiments, the memory 320 may store various data used by at least one component (e.g., the processor 300 and/or the communication circuit 310) of the electronic device 101. As an example, the data may include information related to a retransmission link. According to various embodiments, the memory 320 may store various instructions that may be executed by the processor 300.

According to various embodiments, the electronic device 101 (or the processor 300) may obtain information related to the number of times of retransmission of retransmission data from the external electronic device 220. The electronic device 101 (or the processor 300) may identify another link having transmitted the retransmission data at a previous time point, based on the information related to the retransmission link and the number of times of retransmission of the retransmission data.

According to various embodiments, an electronic device (e.g., the electronic device 101 of FIG. 1, 2, or 3) may include a communication circuit (e.g., the wireless communication module 192 of FIG. 1 or the communication circuit 310 of FIG. 3) supporting WLAN communication, and a processor (e.g., the processor 120 of FIG. 1 or the processor 300 of FIG. 3) operatively connected with the communication circuit. According to various embodiments, the processor may establish a plurality of links (e.g., the first link 231, the second link 232, and/or the third link 233 of FIG. 2) with an external electronic device (e.g., the external electronic device 220 of FIG. 2) via the communication circuit. According to various embodiments, the processor may identify at least one of channel state information or the number of times of reception of retransmission data via each of the plurality of links for a designated time period. According to various embodiments, based on at least one of the channel state information or the number of times of reception of the retransmission data, when the plurality of links includes a link satisfying a designated error condition, the processor may identify another link related to the link satisfying the designated error condition among the plurality of links. According to various embodiments, the processor may restrict the WLAN communication via the another link related to the link satisfying the designated error condition.

According to various embodiments, the channel state information may include at least one of channel utilization, a reference signal received power (RSRP), a reference signal received quality (RSRQ), a received signal strength indicator (RSSI), or a signal to interference plus noise ratio (SINR).

According to various embodiments, the processor may identify a reception rate of the retransmission data of each of the links for a designated time period, based on the number of times of reception of the retransmission data of each of the plurality of links, and detect the link satisfying the designated error condition, based on at least one of the channel state information or the reception rate of the retransmission data.

According to various embodiments, the processor may identify another link having received the retransmission data or data related to the retransmission data before (or immediately before) receiving the retransmission data from the external electronic device via the link satisfying the designated error condition among the plurality of links, based on information related to a designated retransmission link.

According to various embodiments, the information related to the designated retransmission link may be configured via consultation with the external electronic device at a time point of establishing the plurality of links with the external electronic device or after establishing the plurality of links.

According to various embodiments, the processor may restrict the WLAN communication via the another link related to the link satisfying the designated error condition, via a TID-to-link mapping negotiation with the external electronic device.

According to various embodiments, the processor may restrict data reception from the external electronic device via the another link related to the link satisfying the designated error condition, via a TID-to-link mapping negotiation with the external electronic device.

According to various embodiments, the processor may maintain an active state of data transmission to the external electronic device via the another link related to the link satisfying the designated error condition in a state where the data reception from the external electronic device via the another link related to the link satisfying the designated error condition is restricted.

According to various embodiments, the processor may transmit, to the external electronic device, a TID-to-link mapping request frame including information related to the restriction of the data reception from the external electronic device via the another link related to the link satisfying the designated error condition.

According to various embodiments, the processor may identify the retransmission data in a retry field of a frame control field included in a media access control (MAC) header of data received from the external electronic device.

Figure 4:
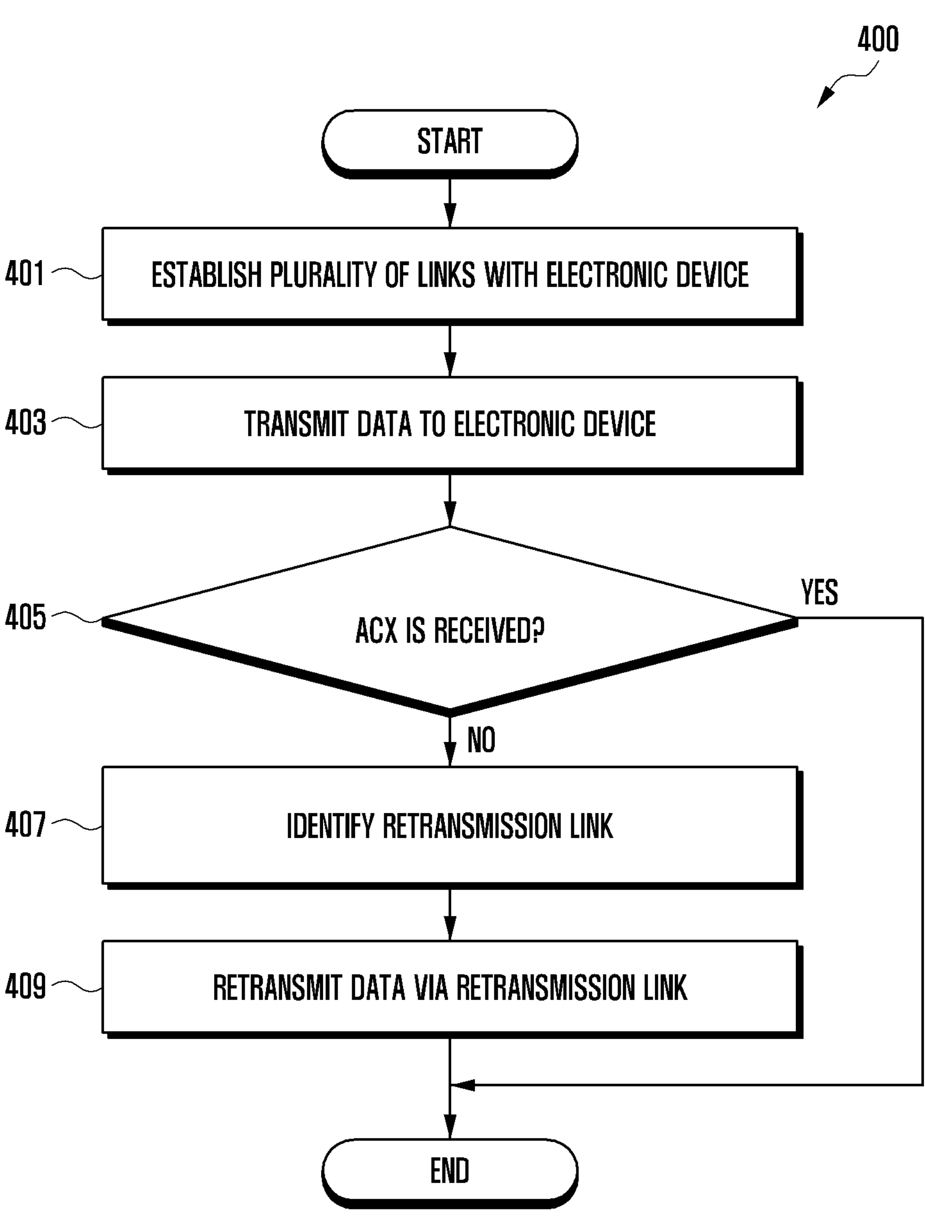
FIG. 4 is a flowchart of retransmitting data in an external electronic device according to various embodiments.
Figure 5:
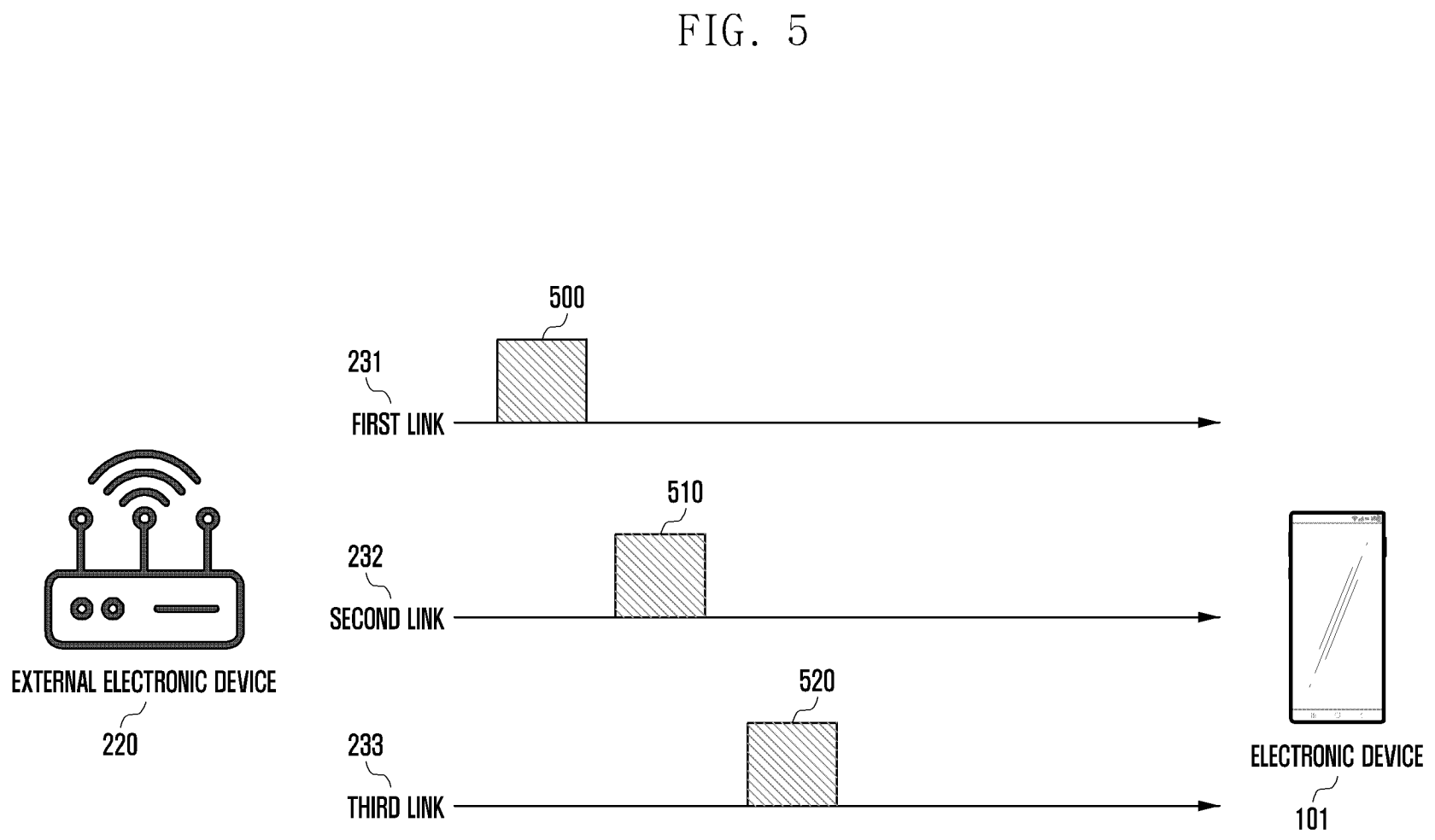

FIG. 4 is a flowchart 400 of retransmitting data in an external electronic device according to various embodiments. In the following embodiments, each operation may be performed sequentially, but is not necessarily performed sequentially. For example, the order of each operation may be changed, and at least two operations may be performed in parallel. As an example, an external electronic device of FIG. 4 may be the electronic device 101 of FIG. 1 or the external electronic device 220 of FIG. 2. As an example, at least a part of FIG. 4 may be described with reference to FIG. 5. FIG. 5 shows an example of retransmitting data by using an MLO in an external electronic device according to various embodiments.

According to various embodiments referring to FIGS. 4 and 5, in operation 401, an external electronic device (e.g., the external electronic device 220 of FIG. 2) or a processor (e.g., the processor 120 of FIG. 1) may establish a plurality of links for WLAN communication with an electronic device (e.g., the electronic device 101 of FIG. 2). According to various embodiments, the external electronic device 220 may establish the first link 231, the second link 232, and/or the third link 233 for the WLAN communication with the electronic device 101. As an example, the plurality of links (e.g., the first link 231, the second link 232, and/or the third link 233 of FIG. 2) may support different frequency bands (e.g., a band of about 2.4 GHz, a band of about 5 GHz, and/or a band of about 6 GHz).

According to various embodiments, in operation 403, the external electronic device or the processor may transmit data to the electronic device 101 via the WLAN communication. According to various embodiments, the external electronic device 220 may transmit data 500 to the electronic device 101 via at least one link (e.g., the first link 231) among the plurality of links (e.g., the first link 231, the second link 232, and/or the third link 233).

According to various embodiments, in operation 405, the external electronic device or the processor may identify whether information (e.g., acknowledgment (ACK)) related to reception success corresponding to the data transmitted to the electronic device 101 is received. According to various embodiments, the external electronic device 220 may identify whether information (e.g., ACK) related to reception success is received via each of the links having transmitted the data to the electronic device 101.

According to various embodiments, the external electronic device or the processor may terminate an embodiment for retransmitting data when the information (e.g., acknowledgment (ACK)) related to reception success corresponding to the data transmitted to the electronic device 101 is received (e.g., "Yes" in operation 405). According to various embodiments, when the information (e.g., ACK) related to reception success is received via each of the links having transmitted the data to the electronic device 101, the external electronic device 220 may determine that data transmission to the electronic device 101 via each of the links has succeeded.

According to various embodiments, when the information (e.g., acknowledgment (ACK)) related to reception success corresponding to the data transmitted to the electronic device 101 is not received (e.g., "No" in operation 405), the external electronic device or the processor may identify a retransmission link for retransmission of the data among the plurality of links in operation 407. According to various embodiments, when the information (e.g., ACK) related to reception success is not received for a designated time period via the first link 231 among the respective links having transmitted the data to the electronic device 101, the external electronic device 220 may determine that data transmission to the electronic device 101 via the first link 231 has failed. As an example, the designated time period may include a maximum time period configured to wait for reception of the information related to reception success from at a time point when the data is transmitted to the electronic device 101 via the first link 231. According to various embodiments, when information (e.g., negative acknowledgment (NACK)) related to reception failure is received via the first link 231 among the respective links having transmitted the data to the electronic device 101, the external electronic device 220 may determine that data transmission to the electronic device 101 via the first link 231 has failed. According to various embodiments, the external electronic device 220 may identify a retransmission link related to the first link 231, based on the determination that the data transmission to the electronic device 101 via the first link 231 has failed. For example, the external electronic device 220 may identify the retransmission link related to the first link 231 among the plurality of links, based on information related to the retransmission link. As an example, the information related to the retransmission link may include information related to a designated pattern for configuring (or selecting) a link for retransmission. As an example, the information related to the retransmission link may be configured via consultation between the electronic device 101 and the external electronic device 220 at a time point of establishing an MLO or after establishing the MLO. As an example, the retransmission link related to the first link 231 may indicate a link for, when transmission of data (or retransmission data) to the electronic device 101 via the first link 231 has failed, retransmitting the data (or retransmission data) which has failed to be transmitted.

According to various embodiments, in operation 409, the external electronic device or the processor may retransmit, to the electronic device 101, the data (or retransmission data) which has failed to be transmitted to the electronic device 101 via the retransmission link. According to various embodiments, when the second link 232 is configured as the retransmission link related to the first link 231, the external electronic device 220 may retransmit, via the second link 232, data (or retransmission data) 510 which has failed to be transmitted to the electronic device 101 via the first link 231. For example, when data to be transmitted via the second link 232 exists, the external electronic device 220 may sequentially transmit the data and the retransmission data via the second link 232, based on priorities of the data and the retransmission data. As an example, the priority of the data may be configured to be relatively higher than the priority of the retransmission data. As an example, the priority of the data may be configured to be relatively lower than the priority of the retransmission data. As an example, the priorities of the data and the retransmission data may be configured based on generation time points of the data and the retransmission data.

According to various embodiments, when it is determined that the transmission of the data 510 retransmitted to the electronic device 101 via the second link 232 has failed, the external electronic device 220 may identify a retransmission link related to the second link 232, based on information related to the retransmission link. When the third link 233 is configured as the retransmission link related to the second link 232, the external electronic device 220 may retransmit, via the second link 233, retransmission data 520 which has failed to be transmitted to the electronic device 101 via the second link 232.

According to various embodiments, the external electronic device 220 may retransmit data via a link different from a link which transmits (or retransmits) data, based on information related to a retransmission link, so as to restrict the expansion of a contention window (CW) for retransmission of data. The external electronic device 220 may restrict the expansion of a CW for retransmission of data, thereby reducing data transmission latency.

Figure 6:
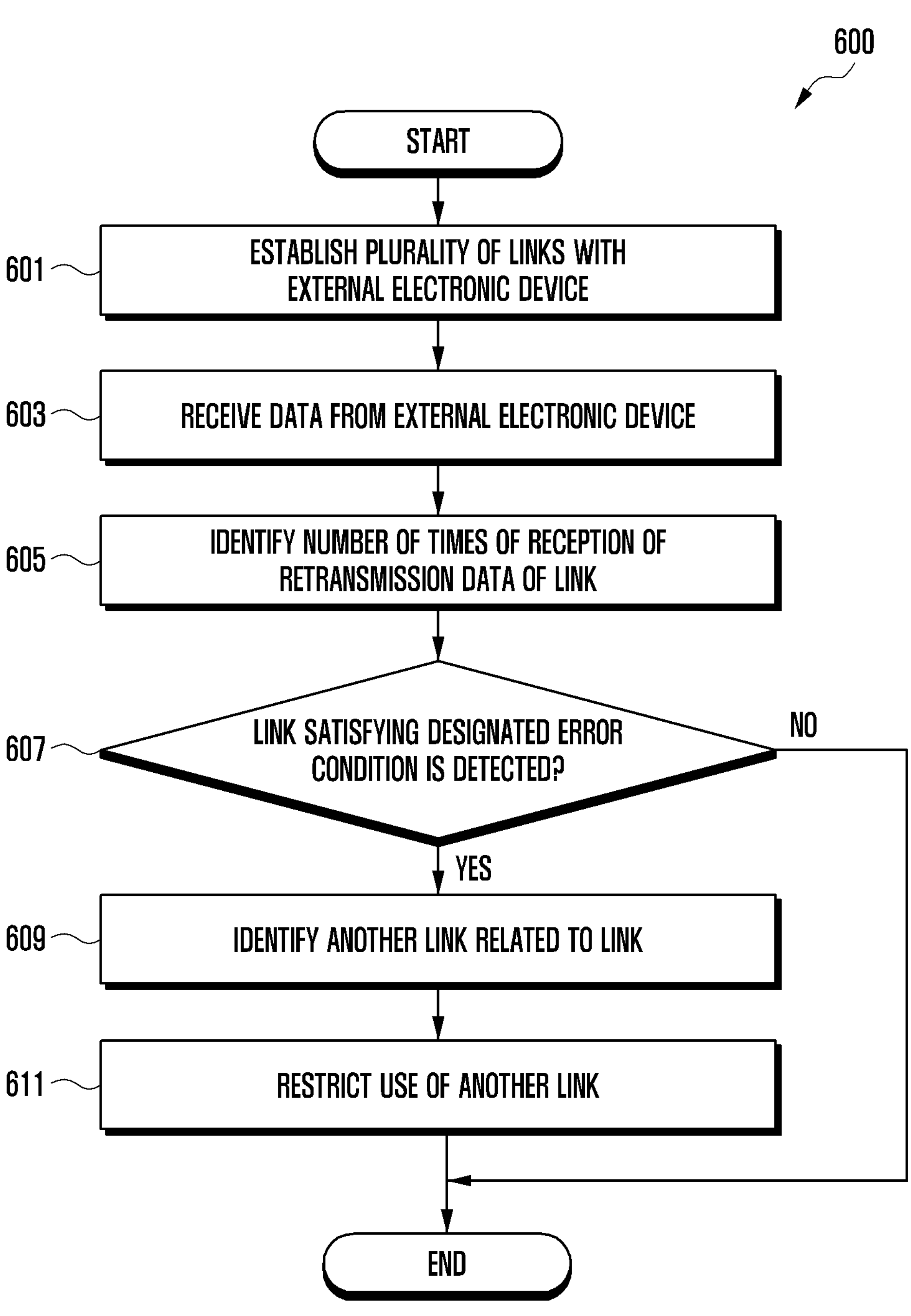
FIG. 6 is a flowchart of restricting the use of a link in which an error has occurred in an electronic device according to various embodiments.
Figure 7:
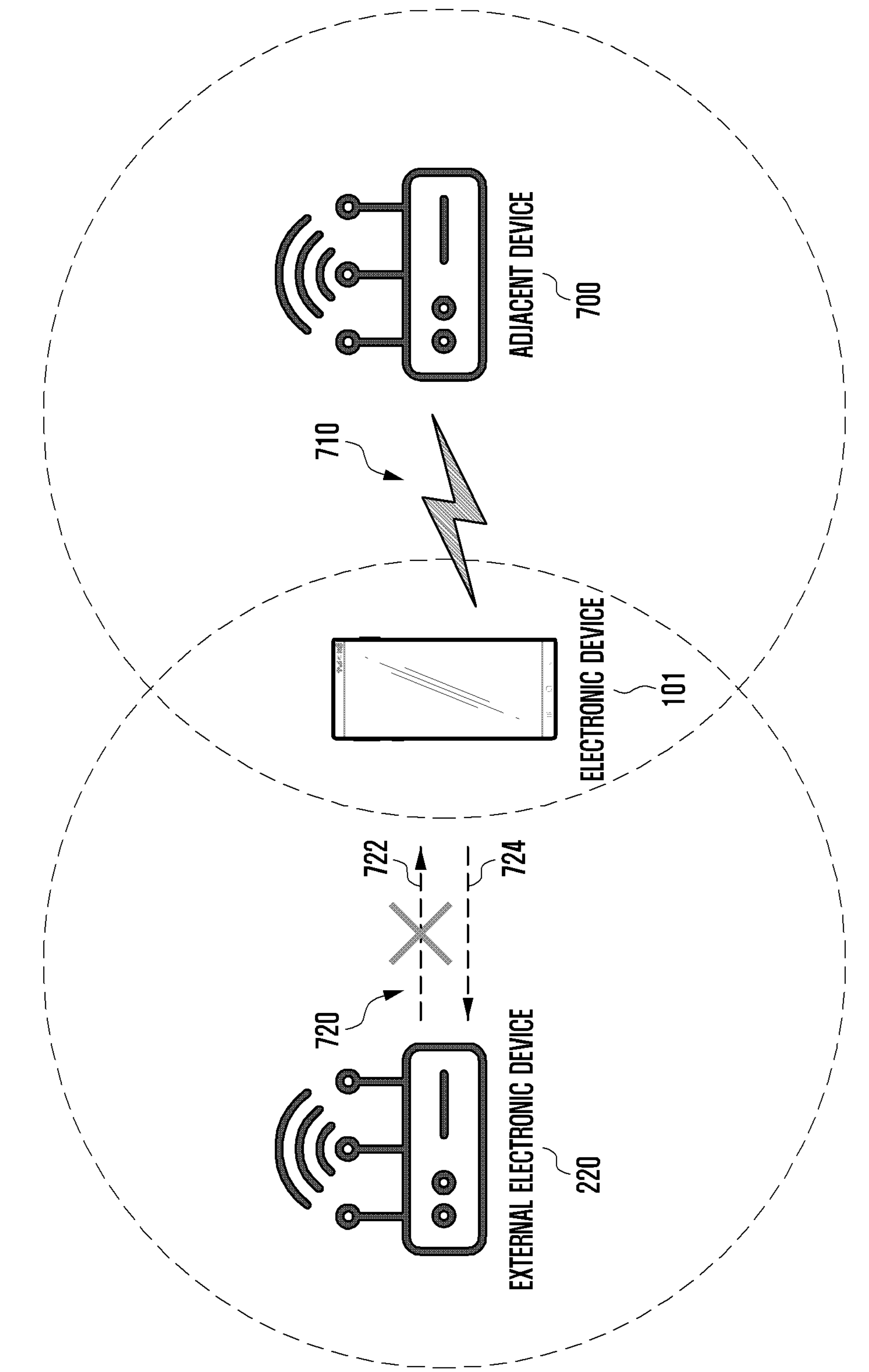
FIG. 7 shows an example of restricting the use of a link in which an error has occurred in an electronic device according to various embodiments.

FIG. 6 is a flowchart 600 of restricting the use of a link in which an error has occurred in an electronic device according to various embodiments of the disclosure. In the following embodiments, each operation may be performed sequentially, but is not necessarily performed sequentially. For example, the order of each operation may be changed, and at least two operations may be performed in parallel. As an example, an electronic device of FIG. 6 may be the electronic device 101 of FIG. 1, 2, or 3. As an example, at least a part of FIG. 6 may be described with reference to FIG. 7. FIG. 7 shows an example of restricting the use of a link in which an error has occurred in an electronic device according to various embodiments.

According to various embodiments referring to FIGS. 6 and 7, in operation 601, an electronic device (e.g., the electronic device 101) or a processor (e.g., the processor 120 of FIG. 1 or the processor 300 of FIG. 3) may establish a plurality of links for WLAN communication with an external electronic device (e.g., the external electronic device 220 of FIG. 2). According to various embodiments, the processor 300 may control the communication circuit 310 to establish the first link 231, the second link 232, and/or the third link 233 for the WLAN communication with the external electronic device 220. As an example, the plurality of links (e.g., the first link 231, the second link 232, and/or the third link 233) may support different frequency bands (e.g., a band of about 2.4 GHz, a band of about 5 GHz, and/or a band of about 6 GHz).

According to various embodiments, in operation 603, the electronic device or the processor (e.g., the processor 120 or 300) may receive data from the external electronic device 220 via at least one link (e.g., the first link 231) among the plurality of links (e.g., the first link 231, the second link 232, and/or the third link 233). According to various embodiments, when decoding of the data received from the external electronic device 220 is completed, the processor 300 may control the communication circuit 310 to transmit information (e.g., ACK) related to reception success to the external electronic device 220 via a link used for reception of the data. According to various embodiments, when the decoding of the data received from the external electronic device 220 has failed, the processor 300 may control the communication circuit 310 to restrict transmission of the information (e.g., ACK) related to reception success. According to various embodiments, when the decoding of the data received from the external electronic device 220 has failed, the processor 300 may control the communication circuit 310 to transmit information (e.g., NACK) related to reception failure to the external electronic device 220 via the link used for reception of the data.

According to various embodiments, in operation 605, the electronic device or the processor (e.g., the processor 120 or 300) may identify the number of times of reception of retransmission data via each of the links. According to various embodiments, the processor 300 may determine whether the corresponding data is retransmission data, based on configuration information of a "retry" subfield of a frame control field included in a media access control (MAC) header of data received via each of the links.

According to various embodiments, in operation 607, the electronic device or the processor (e.g., the processor 120 or 300) may identify whether a link satisfying a designated error condition exists among the plurality of links. According to various embodiments, the processor 300 may determine that the designated error condition is satisfied when the number of times of reception of the retransmission data via each of the links exceeds a designated number of times of error detection. The processor 300 may determine that the designated error condition is not satisfied when the number of times of reception of the retransmission data via each of the links is less than or equal to the designated number of times of error detection. According to various embodiments, the processor 300 may determine that the designated error condition is satisfied when the number of times of reception of the retransmission data via each of the links exceeds the designated number of times of error detection (or a designated reference number of times) and channel state information is equal to or less than a reference value. The processor 300 may determine that the designated error condition is not satisfied when the number of times of reception of the retransmission data via each of the links is less than or equal to the designated number of times of error detection or the channel state information exceeds the reference value. According to various embodiments, the processor 300 may detect a reception rate of the retransmission data of each of the links, based on the number of times of reception of the retransmission data via each of the links for a designated time period. The processor 300 may determine that the designated error condition is satisfied when the reception rate of the retransmission data of each of the links exceeds a designated error detection rate. The processor 300 may determine that the designated error condition is not satisfied when the reception rate of the retransmission data of each of the links is less than or equal to the designated error detection rate. As an example, a reception rate of retransmission data may indicate the rate of the number of times data is received and the number of times retransmission data is received via a specific link for a designated time period. As an example, the channel state information may include at least one of channel utilization, an RSRP, an RSRQ, an RSSI, or an SINR.

According to various embodiments, the electronic device or the processor (e.g., the processor 120 or 300) may terminate an embodiment for restricting the use of a link in which an error has occurred when the link satisfying the designated error condition does not exist (e.g., "No" in operation 607).

According to various embodiments, when the link satisfying the designated error condition exists (e.g., "Yes" in operation 607), the electronic device or the processor (e.g., the processor 120 or 300) may identify another link related to the link satisfying the designated error condition in operation 609. According to various embodiments, when the link satisfying the designated error condition exists, the processor 300 may determine that an error has occurred in the another link related to the link satisfying the designated error condition due to the influence of interference from an adjacent device 700 that the external electronic device 220 does not recognize. According to various embodiments, the processor 300 may detect the another link related to the link satisfying the designated error condition, based on information related to a retransmission link stored in the memory 320. As an example, the another link related to the link satisfying the designated error condition may include a link used for reception at a previous time point (or an immediately previous time point) of data (or retransmission data) related to retransmission data received via the link satisfying the designated error condition. As an example, the information related to the retransmission link may include information related to a link for, when transmission of data (or retransmission data) from the external electronic device 220 to the electronic device 101 via a specific link has failed, retransmitting the data (or retransmission data) which has failed to be transmitted from the external electronic device 220. As an example, the information related to the retransmission link may be configured based on a designated pattern. As an example, the information related to the retransmission link may be configured via consultation between the electronic device 101 and the external electronic device 220 at a time point (e.g., operation 601) when an MLO is established. As an example, a link via which data (or retransmission data) is retransmitted may include a link different from a link via which transmission of data (or retransmission data) has failed in the external electronic device 220 among the plurality of links.

According to various embodiments, in operation 611, the electronic device or the processor (e.g., the processor 120 or 300) may restrict the use of the another link related to the link satisfying the designated error condition. According to various embodiments, the processor 300 may detect the second link 232 which satisfies the designated error condition among the plurality of links of FIG. 2. The processor 300 may identify the first link 231 associated with the second link 232, based on the information related to the retransmission link. As an example, the first link 231 associated with the second link 232 satisfying the designated error condition may indicate a link used for reception at a previous time point (or an immediately previous time point) of data (or retransmission data) related to retransmission data received by the electronic device 101 via the second link 232.

According to various embodiments, the processor 300 may control the communication circuit 310 to restrict the use of the first link 231 via a "TID-to-link mapping" negotiation with the external electronic device 220. For example, the processor 300 may control the communication circuit 310 to transmit, to the external electronic device 220, a "TID-to-link mapping element" in which mapping of a TID and identification information of the first link 231 is released.

According to various embodiments, the processor 300 may control the communication circuit 310 to restrict the use of a downlink of the first link 231 via a "TID-to-link mapping" negotiation with the external electronic device 220. For example, the processor 300 may control the communication circuit 310 to transmit, to the external electronic device 220, a "TID-to-link mapping element" in which mapping of a TID and identification information of a downlink 722 of the first link 231 is released. As an example, an uplink 724 of the first link 231 may be maintained in an active state. As an example, the downlink 722 of the first link 231 may include a link via which the electronic device 101 receives data from the external electronic device 220. As an example, the uplink 724 of the first link 231 may include a link via which the electronic device 101 transmits data to the external electronic device 220.

According to various embodiments, an operation method of an electronic device (e.g., the electronic device 101 of FIG. 1, 2, or 3) may include establishing a plurality of links (e.g., the first link 231, the second link 232, and/or the third link 233 of FIG. 2) with an external electronic device (e.g., the external electronic device 220 of FIG. 2) based on WLAN communication. According to various embodiments, the operation method of the electronic device may include identifying at least one of channel state information or the number of times of reception of retransmission data via each of the plurality of links for a designated time period. According to various embodiments, the operation method of the electronic device may include, based on at least one of the channel state information or the number of times of reception of the retransmission data, when the plurality of links includes a link satisfying a designated error condition, identifying another link related to the link satisfying the designated error condition among the plurality of links. According to various embodiments, the operation method of the electronic device may include restricting the WLAN communication via the another link related to the link satisfying the designated error condition.

According to various embodiments, the channel state information may include at least one of channel utilization, a reference signal received power (RSRP), a reference signal received quality (RSRQ), a received signal strength indicator (RSSI), or a signal to interference plus noise ratio (SINR).

According to various embodiments, the operation method of the electronic device may include identifying a reception rate of the retransmission data of each of the links for a designated time period, based on the number of times of reception of the retransmission data of each of the plurality of links, and detecting the link satisfying the designated error condition, based on at least one of the channel state information or the reception rate of the retransmission data.

According to various embodiments, the identifying of the another link may include identifying another link having received the retransmission data or data related to the retransmission data before (or immediately before) receiving the retransmission data from the external electronic device via the link satisfying the designated error condition among the plurality of links, based on information related to a designated retransmission link.

According to various embodiments, the information related to the designated retransmission link may be configured via consultation with the external electronic device at a time point of establishing the plurality of links with the external electronic device or after establishing the plurality of links.

According to various embodiments, the restricting of the WLAN communication may include restricting the WLAN communication via the another link related to the link satisfying the designated error condition, via a TID-to-link mapping negotiation with the external electronic device.

According to various embodiments, the restricting of the WLAN communication may include restricting data reception from the external electronic device via the another link related to the link satisfying the designated error condition, via a TID-to-link mapping negotiation with the external electronic device.

According to various embodiments, the operation method of the electronic device may include maintaining an active state of data transmission to the external electronic device via the another link related to the link satisfying the designated error condition in a state where the data reception from the external electronic device via the another link related to the link satisfying the designated error condition is restricted.

According to various embodiments, the restricting of the WLAN communication may include transmitting, to the external electronic device, a TID-to-link mapping request frame including information related to the restriction of the data reception from the external electronic device via the another link related to the link satisfying the designated error condition.

According to various embodiments, the operation method of the electronic device may include identifying the retransmission data in a retry field of a frame control field included in a media access control (MAC) header of data received from the external electronic device.

The embodiments of the disclosure disclosed in the specification and the drawings are only particular examples proposed in order to easily describe the technical contents according to the embodiments of the disclosure and help with comprehension of the embodiments of the disclosure, and do not limit the scope of the embodiments of the disclosure. Therefore, the scope of various embodiments of the disclosure should be interpreted to include all changes or modified forms derived based on the technical spirit of various embodiments of the disclosure in addition to the embodiments disclosed herein.

The invention claimed is:

1. An electronic device comprising:

a communication circuit configured to support wireless local area network (WLAN) communication;

at least one processor, comprising processing circuitry, operatively connected with the communication circuit; and memory storing instructions, wherein the instructions, when executed individually and/or collectively by the at least one processor, cause the electronic device to:

establish a plurality of links with an external electronic device via the communication circuit;

identify at least one of channel state information or a number of times of reception of retransmission data of each of the plurality of links for a designated time period;

identify a first link among the plurality of links satisfying a designated error condition related to the identified at least one of the channel state information or the number of times of reception of retransmission data;

based on identifying that the plurality of links includes the first link satisfying the designated error condition, identify a second link related to the first link among the plurality of links, wherein the first link is configured as a retransmission link for the second link; and restrict the WLAN communication including transmission and reception of data via the second link.

2. The electronic device of claim 1, wherein the instructions, when executed by the at least one processor, cause the electronic device to:

identify a reception rate of the retransmission data of each of the plurality of links for the designated time period, based on the number of times of reception of the retransmission data; and detect the first link satisfying the designated error condition, based on at least one of the channel state information of the first link or the reception rate of the retransmission data via the first link.

3. The electronic device of claim 1, wherein the instructions, when executed by the at least one processor cause the electronic device to identify the second link having received a previous retransmission data or data related to the retransmission data before receiving the retransmission data from the external electronic device via the first link satisfying the designated error condition among the plurality of links, based on information related to a designated retransmission link.

4. The electronic device of claim 3, wherein the information related to the designated retransmission link is configured through consultation with the external electronic device at a time point of establishing the plurality of links with the external electronic device or after establishing the plurality of links.

5. The electronic device of claim 1, wherein the instructions, when executed by the at least one processor, cause the electronic device to restrict the WLAN communication via the second link by performing a traffic identifier (TID)-to-link mapping negotiation with the external electronic device.

6. The electronic device of claim 1, wherein the instructions, when executed by the at least one processor, cause the electronic device to restrict data reception from the external electronic device via the second link by performing a TID-to-link mapping negotiation with the external electronic device.

7. The electronic device of claim 6, wherein the instructions, when executed by the at least one processor, cause the electronic device to maintain an active state of data transmission to the external electronic device via the second link in a state where the data reception from the external electronic device via the second link is restricted.

8. The electronic device of claim 6, wherein the instructions, when executed by the at least one processor, cause the electronic device to transmit, to the external electronic device, a TID-to-link mapping request frame comprising information related to the restriction of the data reception from the external electronic device via the second link.

9. The electronic device of claim 1, wherein the instructions, when executed by the at least one processor, cause the electronic device to identify the retransmission data in a retry field of a frame control field included in a media access control (MAC) header of data received from the external electronic device.

10. An operation method of an electronic device, comprising:

establishing a plurality of links with an external electronic device, based on wireless local area network (WLAN) communication;

identifying at least one of channel state information or a number of times of reception of retransmission data of each of the plurality of links for a designated time period;

identifying a first link among the plurality of links satisfying a designated error condition related to the identified at least one of the channel state information or the number of times of reception of retransmission data;

based on identifying that the plurality of links includes the first link satisfying the designated error condition, identifying a second link related to the first link satisfying the designated error condition among the plurality of links, wherein the first link is configured as a retransmission link for the second link; and restricting the WLAN communication including transmission and reception of data via the second link.

11. The method of claim 10, further comprising:

identifying a reception rate of the retransmission data of each of the plurality of links for the designated time period, based on the number of times of reception of the retransmission data; and detecting the first link satisfying the designated error condition, based on at least one of channel state information of the first link or the reception rate of the retransmission data via the first link.

12. The method of claim 10, wherein the identifying of the second link comprises identifying the second link having received the retransmission data or data related to the retransmission data before receiving the retransmission data from the external electronic device via the first link satisfying the designated error condition among the plurality of links, based on information related to a designated retransmission link.

13. The method of claim 12, wherein the information related to the designated retransmission link is configured through consultation with the external electronic device at a time point of establishing the plurality of links with the external electronic device or after establishing the plurality of links.

14. The method of claim 10, wherein the restricting of the WLAN communication comprises restricting the WLAN communication via the second link by performing a traffic identifier (TID)-to-link mapping negotiation with the external electronic device.

15. The method of claim 10, wherein the restricting of the WLAN communication comprises restricting data reception from the external electronic device via the second link by performing a TID-to-link mapping negotiation with the external electronic device.

16. The method of claim 15, further comprising maintaining an active state of data transmission to the external electronic device via the second link in a state where the data reception from the external electronic device via the second link is restricted.

17. The method of claim 15, wherein the restricting of the WLAN communication comprises transmitting, to the external electronic device, a TID-to-link mapping request frame comprising information related to the restriction of the data reception from the external electronic device via the second link.

18. The method of claim 10, further comprising identifying the retransmission data in a retry field of a frame control field included in a media access control (MAC) header of data received from the external electronic device.

* * * * *